United States Patent [19]

Angus

[11] Patent Number: 4,712,664
[45] Date of Patent: Dec. 15, 1987

[54] LOAD-OUT CONSTRUCTION DEVICE

[76] Inventor: James E. Angus, 906 S. 45th St., Temple, Tex. 76501

[21] Appl. No.: 865,207

[22] Filed: May 20, 1986

[51] Int. Cl.⁴ .......................................... B65G 11/18
[52] U.S. Cl. ...................................... 193/17; 182/48; 193/34
[58] Field of Search .............. 193/33, 34, 2 A, 11, 193/17, 18, 25 R, 25 E; 182/48, 49, 206; 187/2; 414/10

[56] References Cited

U.S. PATENT DOCUMENTS

| | | |
|---|---|---|
| 194,082 | 8/1877 | Falk . |
| 208,944 | 10/1878 | Wohlmann .................. 193/25 R |
| 315,720 | 4/1885 | Campbell . |
| 837,602 | 12/1906 | Benenato .................... 193/25 R |
| 876,529 | 1/1908 | Dorman ...................... 193/25 R |
| 1,217,743 | 2/1917 | Franklin ..................... 193/34 X |
| 3,075,612 | 1/1963 | Gould . |
| 3,158,223 | 11/1964 | Brown . |
| 4,099,596 | 7/1978 | Tracy . |
| 4,367,809 | 1/1983 | Eikelmann ................... 182/48 |
| 4,453,619 | 6/1984 | Bierman . |

FOREIGN PATENT DOCUMENTS 313650 6/1929 United Kingdom ............. 182/48

Primary Examiner—Jeffrey V. Nase
Attorney, Agent, or Firm—Richards, Harris, Medlock & Andrews

[57] ABSTRACT

A load-out construction device (10) is provided for conveying debris from a building (12) having a roof (14), floors and an exterior wall (16). The load-out construction device (10) includes a hopper (18). The load-out construction device (10) further includes a suspension system (30) including a pair of hooks (32) which are mounted to end walls (20, 22) of the hopper (18). An end (32a) of each hook (32) contacts the roof (14) or a floor of the building (12) and an end (32b) of each hook (32) contacts the exterior wall (16) of the building (12).

4 Claims, 4 Drawing Figures

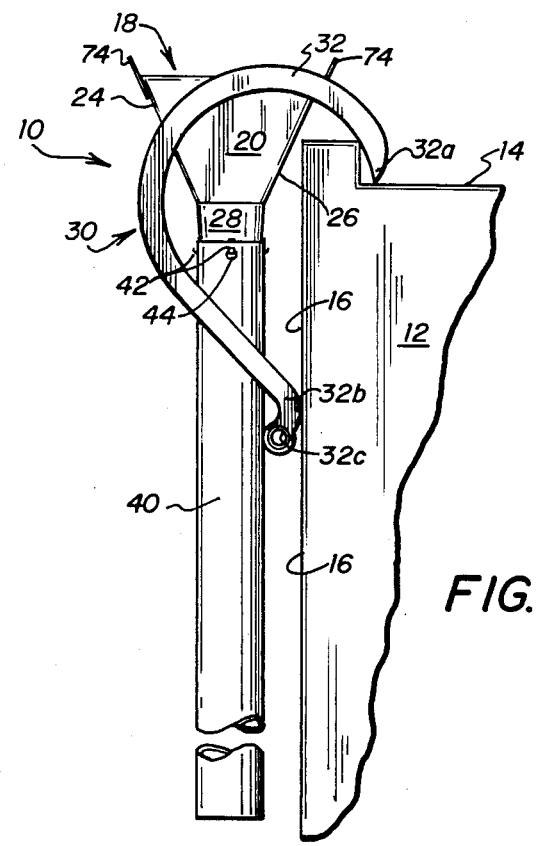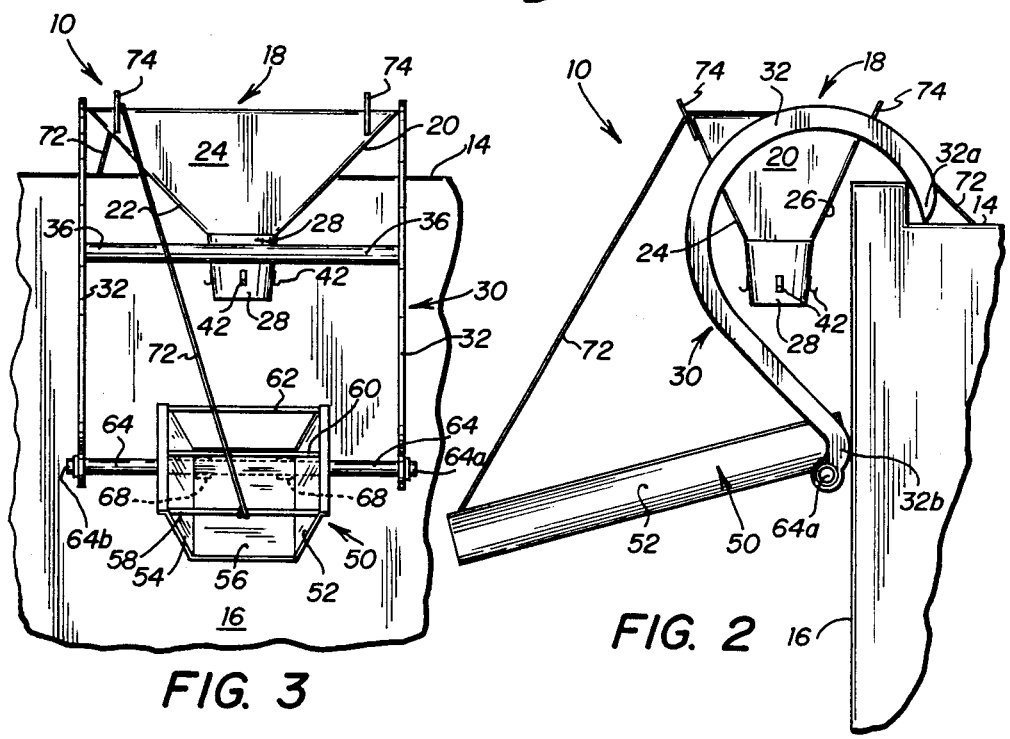
FIG. 1
FIG. 2
FIG. 3

LOAD-OUT CONSTRUCTION DEVICE

TECHNICAL FIELD

This invention relates to construction devices, and more particularly to a load-out chute.

BACKGROUND ART

Typically, in the construction and maintenance of buildings, it is necessary to transport debris from the roof or an upper floor of a building to ground level. Various types of chutes have been developed to assist construction workers in this removal. Where chutes are not used, construction workers typically haul the material in wheel barrels which are then rolled to the side of the building and the contents dumped into a receptacle at ground level.

Load-out chutes are used to assist workers and also better direct the debris as it falls from a floor or the roof of the building into the receptacle. The load-out device must be supported at the floor or roof and may require several construction workers and heavy equipment to position the load-out device for use. Additionally, such load-out devices must be carefully supported once in position to receive the debris deposited by the construction workers. Previously developed load-out devices have been supported by weights and have utilized levers to hold them in position or to mount such devices to the roof of a building. Such devices have been complicated to install due to weight considerations as well as attachment requirements.

A need has thus arisen for an improved load-out construction device which is easy to install at a construction site and which is reliable in use. Further, a need has arisen for a load-out construction device which can be used as a hoist for transporting material to and from a roof of a building.

DISCLOSURE OF THE INVENTION

In accordance with the present invention, a load-out construction device is provided which substantially eliminates the problems heretofore associated with such construction devices.

In accordance with the present invention, a load-out device for conveying debris from a building having a roof, floors and exterior walls is provided. The device includes a hopper and a suspension system for mounting the hopper to the roof or floor of the building. The suspension system includes a pair of hooks mounted to the hopper. The hooks include a first end for contacting the roof or a floor of the building and a second end for contacting the exterior wall of the building.

In accordance with another aspect of the present invention, a load-out device for conveying debris from a building having a roof, floors and exterior walls is provided. The load-out device includes a funnel shaped hopper having a pair of sidewalls and a pair of end walls. A pair of C-shaped hooks, each having first and second ends is attached to the end walls of the hopper for suspending the hopper on the building. The first ends of the hooks are pointed for contacting the roof or a floor of the building. The second ends of the hooks are disposed for contacting the exterior wall of the building. Structure is also provided for receiving the debris from the hopper. The debris receiving structure includes a flexible tube or a chute.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 is a side elevational view of the loadout device of the present invention illustrating one embodiment of the debris receiving structure;

FIG. 2 is a side elevational view of the loadout device of the present invention illustrating a second embodiment of the debris receiving structure;

FIG. 3 is a front elevational view of the load-out device shown in FIG. 2; and

DETAILED DESCRIPTION

Figure 4:
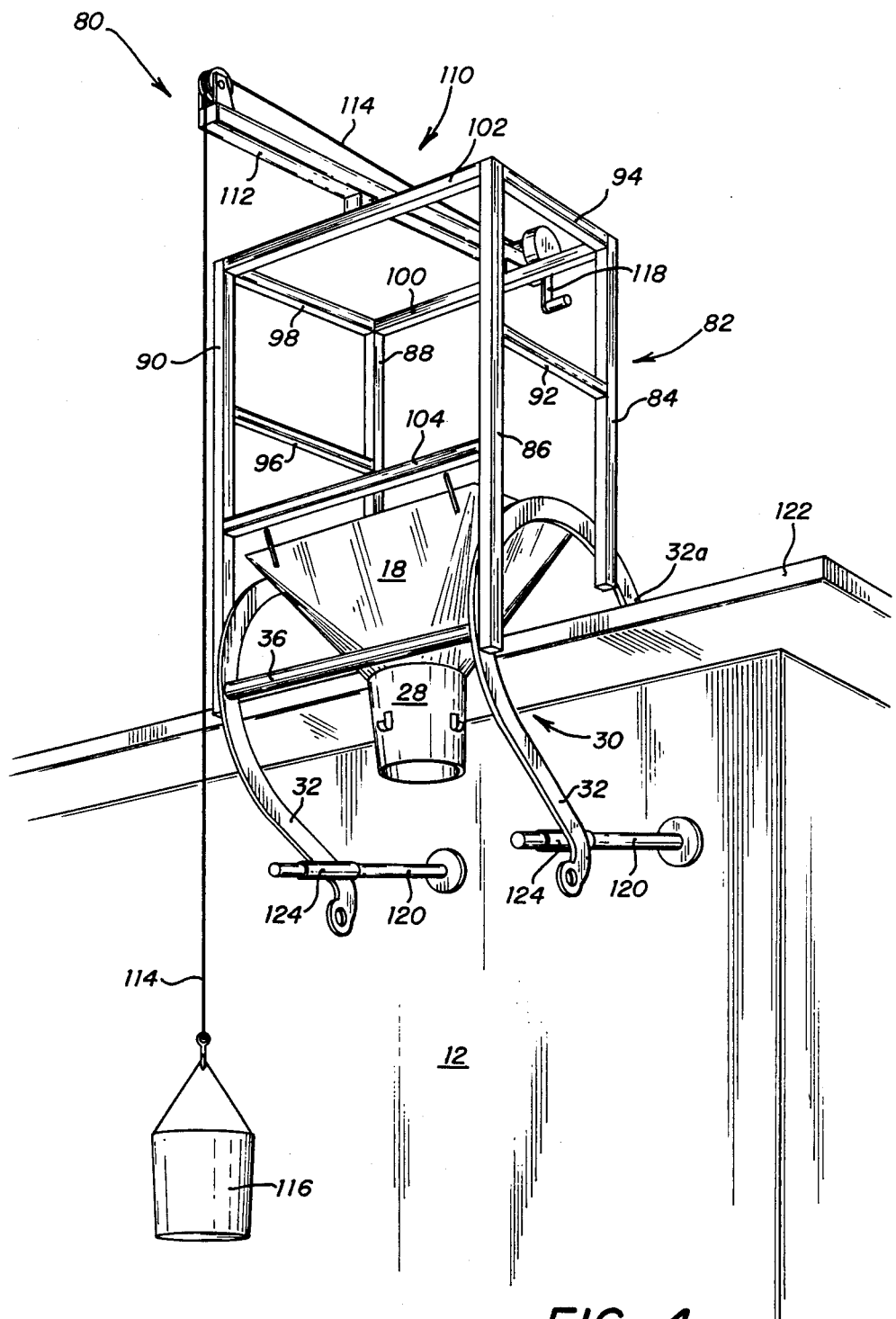
FIG. 4 is a perspective view of the load-out device of the present invention illustrating the hoist embodiment.

Referring to FIG. 1, the load-out construction device of the present invention is illustrated and is generally identified by the numeral 10. Load-out construction device 10 is illustrated as being suspended from a building 12 having a roof 14 and an exterior wall 16.

Load-out construction device 10 includes a hopper 18 having end walls 20 and 22 (FIG. 3). Hopper 18 further includes sidewalls 24 and 26. Walls 20, 22, 24 and 26 converge to a funnel 28.

Hopper 18 is suspended on building 12 using a suspension system generally identified by the numeral 30. Suspension system 30 includes a pair of hooks 32 which are generally C-shaped in appearance. Hooks 32 include a first end 32a and a second end 32b. End 32a is pointed and engages roof 14. End 32b of hook 32 is disposed against exterior wall 16 of building 12. Ends 32b of hooks 32 further include an aperture 32c. Hooks 32 are integrally attached to end walls 20 and 22 of hopper 18 by welding, bolts or the like. As more clearly shown in FIG. 3, hooks 32 are interconnected by a support bar 36.

An important aspect of the present invention is the use of hooks 32 which allow for the simple installation of load-out device 10 to a building. Hopper 18 is completely suspended from building 12 utilizing hooks 32 without the use of additional weights and levers. The present invention therefore provides for a simply suspension system for a hopper. Although the Figures illustrate load-out construction device 10 as being suspended from a roof of a building, the present invention can also be utilized as being suspended from a floor in the building such as, for example, at an open window or door.

FIG. 1 further illustrates one embodiment of the present debris receiving structure which includes a flexible tube 40. Flexible tube 40 is interconnected to funnel 28 utilizing clips 42 which engage apertures 44 disposed in the top of flexible tube 40. Flexible tube 40 is disposed between hooks 32 and lies parallel to the exterior wall 16 of building 12. Flexible tube 40 may extend to a dumpster or dump truck located at the ground level of building 12. Flexible tube 40 receives the debris from hopper 18 and transports the debris from the upper floor level of the building 12 or roof 14 to ground level.

Referring simultaneously to FIGS. 2 and 3, a second embodiment of a debris receiving device is illustrated in the form of a chute, generally identified by the numeral 50. Chute 50 includes sidewalls 52 and 54 and a bottom interconnecting bottom wall 56. Sidewalls 52 and 54 are interconnected along their top edges by rods 58, 60 and 62. Chute 50 is interconnected between hooks 32 using a rod 64 having ends 64a and 64b. Ends 64a and 64b of rod 64 engage the apertures 32c within ends 32b of hooks 32. Rod 64 further engages mounting clips 68 disposed on the underside of bottom wall 56 of chute 50 for mounting chute 50 to rod 64.

Chute 50 is pivotally mounted to hooks 32 utilizing rod 64 such that chute 50 can be rotated from a substantially horizontal position, perpendicular to exterior wall 16 of building 12 to a position substantially parallel to exterior wall 16 of building 12. The positioning of chute 50 is controlled by a line or chain 72 which is attached to rod 58 of chute 50. The other end of chain 72 extends over hopper 18 and may be attached to roof 14 of building 12. The movement of chain 72 is confined between hooks 32 using stops 74 which are attached to sidewalls 24 and 26 of hopper 18.

Referring now to FIG. 4, the present load-out construction device 10 is illustrated for use as a hoist, generally identified by the numeral 80. Hoist 80 includes a frame 82 which includes legs 84, 86, 88 and 90. Legs 84 and 86 are interconnected using a centrally disposed rod 92 and a rod 94 connecting the tops of legs 84 and 86. Similarly, legs 88 and 90 are interconnected by a centrally disposed bar 96 and a bar 98 connecting the tops of legs 88 and 90. The tops of legs 84 and 88 are interconnected using a bar 100. The tops and bottoms of legs 86 and 90 are interconnecting using bars 102 and 104, respectively. The bottom of legs 84 and 88 are connected to end 32b of hooks 32. The bottom of legs 86 and 90 are connected centrally to hooks 32 between ends 32a and 32b. Therefore, it can be seen that frame 82 is supported by hooks 32 above hopper 18. The connections between legs 84, 86, 88 and 90 as well as the connections between frame 82 and hooks 32 are made by welding or alternatively by mechanical connections.

Frame 82 supports a pulley arrangement, generally identified by the numeral 110 having an arm 112 which is mounted to frame 82. Arm 112 supports a rope or chain 114 which may be attached to equipment, supplies or a bucket 116 as illustrated in FIG. 4. Rope 114 is retracted and extended using a crank arm 118 located on arm 112.

FIG. 4 also illustrates the use of standoffs 120 which extend between exterior walls 16 of the building 12 and ends 32b of hooks 32. In this manner, hooks 32 can be suspended on a building 12 which may have an overhand such as, for example, structure 122 in FIG. 4. Standoffs 120 are attached to a bracket 124 located at ends 32b of hooks 32.

While FIG. 4 illustrates the use of hoist 80 in combination with hopper 18 of load-out construction device 10, it should be understood that hoist 80 can also be utilized with hooks 32 separate and apart from hopper 18.

It therefore can be seen that the present invention provides for a load-out construction device that is easy to suspend from a building as well as being easy to transport and position for use. The present load-out construction device includes hooks which support a hopper without any additional weights or levers.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A load-out device for conveying debris from a building having a roof, floors and an exterior wall comprising:

a hopper having a pair of side walls and a pair of end walls;

suspension means for mounting said hopper to the roof or a floor of the building, said suspension means including a pair of hooks mounted on said end walls of said hopper wherein each of said hooks has a first and second end, such that said first end contacts the roof or floor of the building and said second end contacts an exterior wall of the building;

a rod pivotally mounted between said second ends of said hooks;

a chute mounted on said rod for receiving debris from said hopper; and means attached to said chute for adjusting the position of said chute with respect to the building.

2. The load-out device of claim 1 wherein said first ends of said hooks are pointed.

3. The load-out device of claim 1 wherein said hooks are generally C-shaped.

4. The load-out device of claim 1 wherein said walls of said hopper converge toward each other to form a funnel.

* * * * *